United States Patent
Yoshida et al.

(10) Patent No.: US 8,136,346 B2
(45) Date of Patent: Mar. 20, 2012

(54) INTERNAL COMBUSTION ENGINE

(75) Inventors: Kohei Yoshida, Gotenba (JP); Shinya Hirota, Susono (JP); Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1021 days.

(21) Appl. No.: 12/083,009

(22) PCT Filed: Dec. 1, 2006

(86) PCT No.: PCT/JP2006/324503
§ 371 (c)(1),
(2), (4) Date: Apr. 3, 2008

(87) PCT Pub. No.: WO2007/066745
PCT Pub. Date: Jun. 14, 2007

(65) Prior Publication Data
US 2009/0038291 A1 Feb. 12, 2009

(30) Foreign Application Priority Data
Dec. 5, 2005 (JP) .................. 2005-351077

(51) Int. Cl.
*F01N 3/00* (2006.01)
*F01N 3/10* (2006.01)
(52) U.S. Cl. .......................... 60/286; 60/301
(58) Field of Classification Search .............. 60/286
See application file for complete search history.

(56) References Cited

U.S. PATENT DOCUMENTS

| | | | |
|---|---|---|---|
| 5,657,625 A * | 8/1997 | Koga et al. ................ | 60/274 |
| 5,954,617 A * | 9/1999 | Horgan et al. ............. | 477/107 |
| 6,393,834 B1 | 5/2002 | Takaoka et al. | |
| 6,493,626 B2 | 12/2002 | Mitani et al. | |
| 2001/0015066 A1 * | 8/2001 | Takaku et al. ............ | 60/285 |
| 2001/0044687 A1 | 11/2001 | Mitani et al. | |
| 2002/0189244 A1 * | 12/2002 | Surnilla et al. ........... | 60/285 |
| 2004/0118116 A1 * | 6/2004 | Beck et al. ............... | 60/601 |
| 2005/0223699 A1 * | 10/2005 | Ancimer et al. .......... | 60/286 |

FOREIGN PATENT DOCUMENTS

| | | |
|---|---|---|
| DE | 103 03 085 A1 | 1/2004 |
| EP | 1 510 679 A2 | 3/2005 |
| JP | A-2001-329886 | 11/2001 |

(Continued)

OTHER PUBLICATIONS

European Search Report issued on Oct. 5, 2009 for European Patent Application No. 06 83 4258.

(Continued)

*Primary Examiner* — Thomas Denion
*Assistant Examiner* — Jason Shanske
(74) *Attorney, Agent, or Firm* — Oliff & Berridge, PLC

(57) ABSTRACT

A post-treatment system comprised of an $SO_x$ trapping catalyst (11), a particulate filter (13) carrying an $NO_x$ storing and reducing catalyst, and an $NO_x$ storing and reducing catalyst (15) and a fuel feed valve (17) for feeding fuel for post processing to the post-treatment system are arranged in an engine exhaust passage. Each time an operating period of the engine passes a certain period, values of operating parameters of the engine and the method of feeding the post-treatment use fuel are reset so that the total amount of consumption of the combustion use fuel and post-treatment use fuel becomes smallest while maintaining the amounts of the harmful components discharged into the atmosphere at below the regulatory values.

12 Claims, 12 Drawing Sheets

FOREIGN PATENT DOCUMENTS

| | | |
|---|---|---|
| JP | A-2003-129829 | 5/2003 |
| JP | A-2003-193841 | 7/2003 |
| JP | A-2004-144052 | 5/2004 |
| JP | A-2005-291098 | 10/2005 |
| WO | WO 2005/040571 A1 | 5/2005 |
| WO | WO 2005/098222 A1 | 10/2005 |
| WO | WO 2005098222 A1 * | 10/2005 |

OTHER PUBLICATIONS

Translated Chinese Office Action issued in Application No. 200680044470.1; Dated Jul. 12, 2010.

* cited by examiner (A)

(B)

(A)

ADVANCED ← INJECTION TIMING → RETARDED (B)

EGR RATE (C)

INTERNAL COMBUSTION ENGINE

TECHNICAL FIELD

The present invention relates to an internal combustion engine.

BACKGROUND ART

Known in the art is an internal combustion engine wherein an $NO_x$ storing and reducing catalyst storing $NO_x$ contained in exhaust gas when an air-fuel ratio of inflowing exhaust gas is lean and releasing the stored $NO_x$ when the air-fuel ratio of the inflowing exhaust gas becomes the stoichiometric air-fuel ratio or rich is arranged in an engine exhaust passage (see for example Japanese-Patent Publication (A) No. 2003-129829). In this internal combustion engine, when combustion is performed under a lean air-fuel ratio, the generated $NO_x$ is stored in the $NO_x$ storing and reducing catalyst. On the other hand, when the $NO_x$ storage ability of the $NO_x$ storing and reducing catalyst approaches saturation, the air-fuel ratio of the exhaust gas is temporarily made rich whereby $NO_x$ is released from the $NO_x$ storing and reducing catalyst and reduced.

However, if the amount of $NO_x$ discharged from the combustion chambers increases, the amount of consumption of post-treatment use fuel fed for making the air-fuel ratio of the exhaust gas rich for releasing the $NO_x$ from the $NO_x$ storing and reducing catalyst increases and, as the degree of deterioration of the $NO_x$ storing and reducing catalyst increases, the amount of consumption of this post-treatment use fuel increases. On the other hand, if for example the fuel injection timing, one operating parameter of the engine, is advanced, the combustion temperature rises, so the amount of generation of $NO_x$ increases, but the combustion efficiency rises, so the fuel injection amount, that is, the amount of combustion of the combustion use fuel, is decreased.

If an operating state is made a state where the amount of $NO_x$ generated in the combustion chambers increases in this way, the amount of consumption of the combustion use fuel decreases, but the amount of consumption of post-treatment use fuel increases. Conversely to this, if the operating state is made a state where the amount of $NO_x$ generated in the combustion chambers decreases, the amount of consumption of the combustion use fuel increases, but the amount of consumption of the post-treatment use fuel decreases. In this case, maintaining the amount of $NO_x$ discharged into the atmosphere at below the regulatory value is an absolute condition. What is demanded the most under such a condition is that the total amount of consumption of combustion use fuel and post-treatment use fuel per set driving distance of the fuel be reduced as much as possible. That is, it is demanded that the engine be set in an operating state where the total amount of consumption of fuel per set driving distance becomes the smallest, in other words, an operating state where the amount of $CO_2$ discharged per set driving distance becomes the smallest.

In this case, as explained above, the higher the degree of deterioration of the $NO_x$ storing and reducing catalyst, the greater the amount of consumption of post-treatment use fuel, so the operating state where the total amount of consumption of the fuel becomes smallest changes depending on the degree of deterioration of the $NO_x$ storing and reducing catalyst. In this way, when purifying the exhaust gas of the harmful components, it is necessary to consider the total amount of consumption of the fuel including not only the amount of consumption of the post-treatment use fuel, but also the amount of consumption of the combustion use fuel. In the past, the total amount of consumption of the fuel was not considered at all. Therefore, in the past, there was the problem that the amount of consumption of fuel per set driving distance, that is, the amount of $CO_2$ exhausted per set driving distance, could not be minimized.

DISCLOSURE OF THE INVENTION

An object of the present invention is to provide an internal combustion engine able to minimize the total amount of consumption of fuel used per set driving distance, that is, the amount of $CO_2$ discharged per set driving distance.

According to the present invention, there is provided an internal combustion engine where a post-treatment system of exhaust gas is arranged in an engine exhaust passage, post-treatment use fuel for treating harmful components in exhaust gas in the post-treatment system is fed in addition to combustion use fuel fed into combustion chamber for generating engine output, and values of operating parameters of the engine are preset in accordance with an operating state of the engine and a method of feeding the post-treatment use fuel is preset, wherein, each time an operating period of the engine passes a predetermined time period, the values of the operating parameters and the method of feeding the post-treatment use fuel are reset so that the total amount of consumption of the combustion use fuel and post-treatment use fuel per set driving distance of the fuel becomes smallest while maintaining the amounts of harmful components in the exhaust gas discharged into the atmosphere at below regulatory values.

BEST MODE FOR CARRYING OUT THE INVENTION

Figure 1:
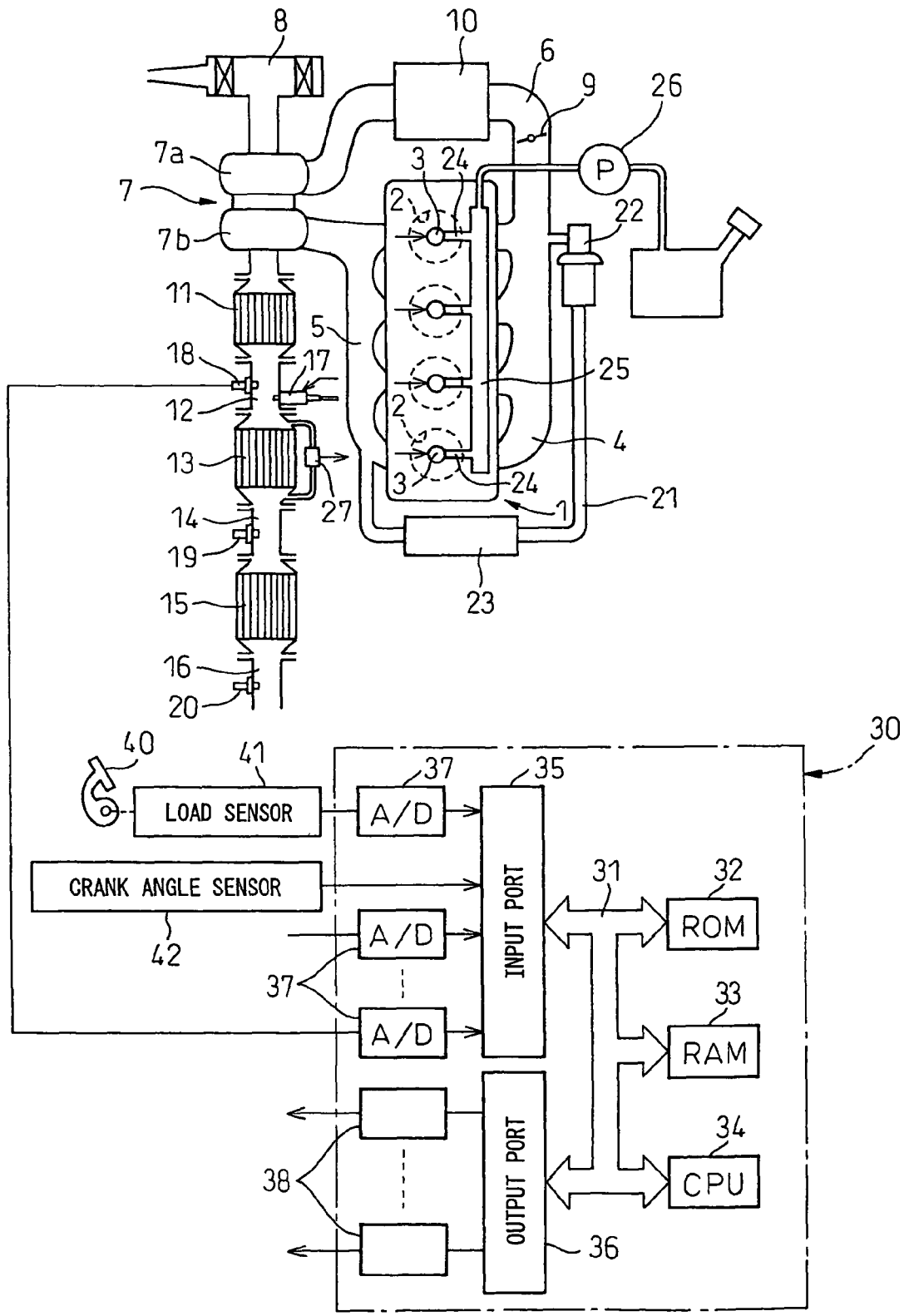
FIG. 1 is an overview of a compression ignition type internal combustion engine, FIG. 2 are views showing the structure of a particulate filter.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into the combustion chamber 2, 4 an intake manifold, and 5 an exhaust manifold. The intake manifold 4 is connected via an intake duct 6 to an outlet of a compressor 7a of an exhaust turbocharger 7, while an inlet of the compressor 7a is connected to an air cleaner 8. The intake duct 6 has a throttle valve 9 driven by a step motor arranged inside it. Further, around the intake duct 6, a cooling system 10 for cooling the intake air flowing through the inside of the intake duct 6 is arranged. In the embodiment shown in FIG. 1, the engine cooling water is led into the cooling system 10 where the engine cooling water cools the intake air.

On the other hand, the exhaust manifold 5 is connected to an inlet of the exhaust turbine 7b of the exhaust turbocharger 7, while an outlet of the exhaust turbine 7b is connected to an inlet of an $SO_x$ trapping catalyst 11. Further, the outlet of the $SO_x$ trapping catalyst 11 is connected through an exhaust pipe 12 to the inlet of a particulate filter 13. The outlet of the particulate filter 13 is connected through an exhaust pipe 14 to an $NO_x$ storing and reducing catalyst 15. A fuel feed valve 17 for feeding post-treatment use fuel in the exhaust gas flowing through the inside of the exhaust pipe 12 is arranged in the exhaust pipe 12. Further, inside each of the exhaust pipes 12 and 14 and an exhaust pipe 16 connected to the outlet of the $NO_x$ storing and reducing catalyst 15, sensors 18, 19, and 20 comprised of an air-fuel ratio sensor, $O_2$ sensor, $NO_x$ sensor or $SO_x$ sensor, are arranged.

The exhaust manifold 5 and the intake manifold 4 are connected through an exhaust gas recirculation (hereinafter referred to as an "EGR") passage 21. The EGR passage 21 has an electronic control type EGR control value 22 arranged inside it. Further, around the EGR passage 21 is arranged a cooling system 23 for cooling the EGR gas flowing through EGR passage 21. In the embodiment shown in FIG. 1, the engine cooling water is led into the cooling system 23 where the engine cooling water cools the EGR gas. On the other hand, each fuel injector 3 is connected through a fuel feed pipe 24 to a common rail 25. This common rail 25 is fed with fuel from an electronic control type variable discharge fuel pump 26. The fuel fed into the common rail 25 is fed through each fuel feed pipe 24 to a fuel injector 3.

An electronic control unit 30 is comprised of a digital computer and is provided with an ROM (read only memory) 32, RAM (random access memory) 33, CPU (microprocessor) 34, input port 35, and output port 36 connected with each other through a bi-directional bus 31. The output signals of the sensors 18, 19, and 20 are input through corresponding AD converters 37 to the input port 35. Further, the particulate filter 13 has a differential pressure sensor 27 for detecting the differential pressure before and after the particulate filter 13 attached to it. The output signal of this differential pressure sensor 27 is input through the corresponding AD converter 37 to the input port 35.

The accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft rotates by for example 15° connected to it. On the other hand, the output port 36 is connected through corresponding drive circuits 38 to each fuel injector 3, throttle valve 9 drive step motor, fuel feed valve 17, EGR control value 22, and fuel pump 26.

In the embodiment shown in FIG. 1, the particulate filter 13 arranged on the upstream side of the $NO_x$ storing and reducing catalyst 15 also carries an $NO_x$ storing and reducing catalyst. Therefore, first, the structure of the particulate filter 13 will be explained, then the $NO_x$ storing and reducing catalyst 15 and the $NO_x$ storing and reducing catalyst carried on the particulate filter 13 will be explained.

Figure 2:
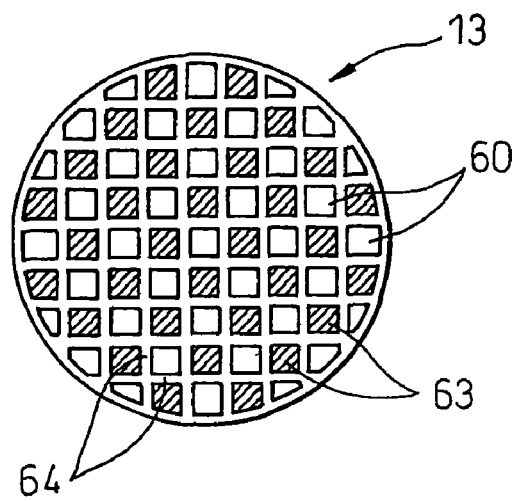
Figure 2:
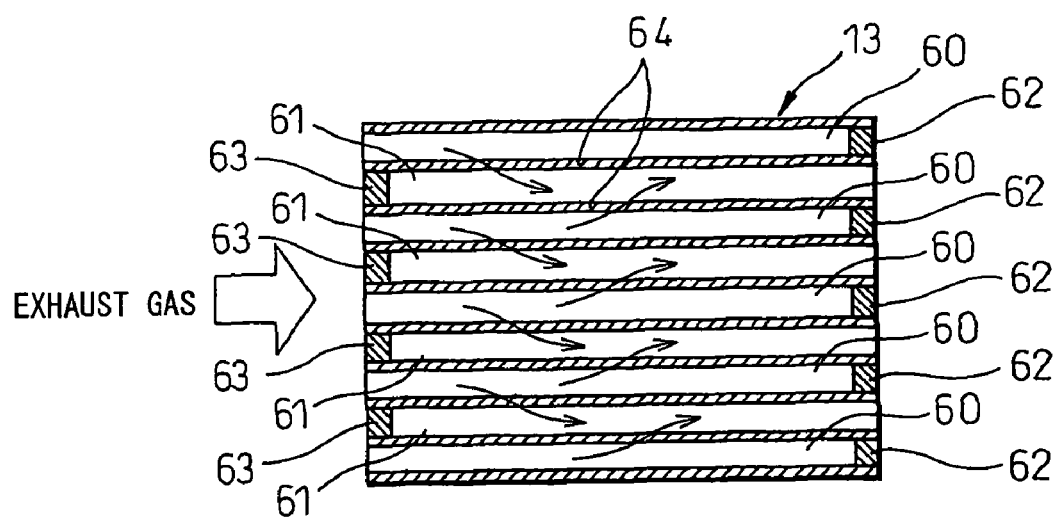

FIGS. 2(A) and (B) show the structure of the particulate filter 13 carrying the $NO_x$ storing and reducing catalyst. Note that FIG. 2(A) is a front view of the particulate filter 13, while FIG. 2(B) shows a side cross-sectional view of the particulate filter 13. As shown in FIGS. 2(A) and (B), the particulate filter 13 forms a honeycomb structure and is provided with a plurality of exhaust flow passages 60 and 61 extending in parallel to each other. These exhaust flow passages are comprised of exhaust gas inflow passages 60 with downstream ends closed by plugs 62 and exhaust gas outflow passages 61 with upstream ends closed by plugs 63. Note that the hatched parts in FIG. 2(A) show the plugs 63. Therefore, the exhaust gas inflow passages 60 and the exhaust gas outflow passages 61 are alternately arranged via thin partition walls 64. In other words, the exhaust gas inflow passages 60 and the exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The particulate filter 13 is for example formed from a porous material such as cordierite. Therefore, the exhaust gas flowing into the exhaust gas inflow passages 60, as shown by the arrows in FIG. 2(B), passes through the surrounding partition walls 64 and flows into the adjoining exhaust gas outflow passages 61. In this particulate filter 13, an $NO_x$ storing and reducing catalyst is carried on the peripheral walls of the exhaust gas inflow passages 60 and exhaust gas outflow passages 61, that is, the two surfaces of the partition walls 64 and inside walls of the pores in the partition walls 64.

Figure 3:
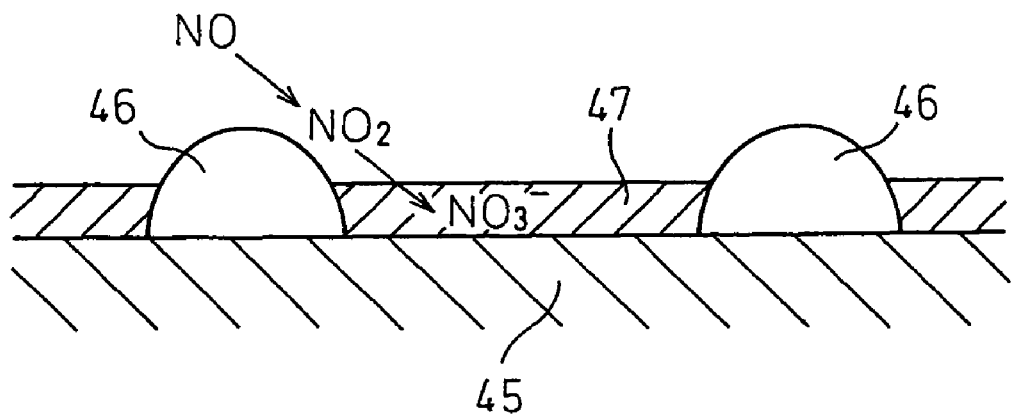
FIG. 3 is a cross-sectional view of a surface part of a catalyst carrier of an $NO_x$ storing and reducing catalyst.

In the $NO_x$ storing and reducing catalyst carried on the particulate filter 13 and the $NO_x$ storing and reducing catalyst 15, a catalyst carrier comprised of for example alumina is carried on a base member. FIG. 3 schematically shows the cross-section of the surface part of this catalyst carrier 45. As shown in FIG. 3, the surface of the catalyst carrier 45 carries a precious metal catalyst 46 diffused on it. Further, the surface of the catalyst carrier 45 is formed with a layer of an $NO_x$ absorbent 47.

In an embodiment according to the present invention, platinum Pt is used as the precious metal catalyst 46. As the component forming the $NO_x$ absorbent 47, for example, at least one element selected from potassium K, sodium Na, cesium Cs, and other alkali metals, barium Ba, calcium Ca and other alkali earths, lanthanum La, yttrium Y, and other rare earths is used.

If referring to the ratio of the air and fuel (hydrocarbons) fed into the engine intake passage, combustion chambers 2, and exhaust passage upstream of the particulate filter 13 as the "air-fuel ratio of the exhaust gas", an absorption and release action of $NO_x$, such that the $NO_x$ absorbent 47 absorbs $NO_x$ when the air-fuel ratio of the exhaust gas is lean and releases the absorbed $NO_x$ when the concentration of oxygen in the exhaust gas falls, is performed.

That is, explaining this taking as an example the case of using barium Ba as the component forming the $NO_x$ absorbent 47, when the air-fuel ratio of the exhaust gas is lean, that is, when the concentration of oxygen in the exhaust gas is high, the NO contained in the exhaust gas is oxidized on the platinum Pt 46 and becomes $NO_2$ as shown in FIG. 3, then this is absorbed in the $NO_x$ absorbent 47 and bonds with the barium oxide BaO while diffusing in the form of nitrate ions $NO_3^-$ in the $NO_x$ absorbent 47. In this way, the $NO_x$ is absorbed in the $NO_x$ absorbent 47. So long as the concentration of oxygen in the exhaust gas is high, $NO_2$ is formed on the surface of the platinum Pt 46. So long as the $NO_x$ absorbent 47 does not become saturated in $NO_x$ absorption ability, the $NO_2$ is absorbed in the $NO_x$ absorbent 47 and nitrate ions $NO_3^-$ are generated.

As opposed to this, if making the air-fuel ratio of the exhaust gas rich or the stoichiometric air-fuel ratio by feeding fuel by the fuel feed valve 17, the concentration of oxygen in the exhaust gas falls, so the reaction proceeds in the opposite direction ($NO_3^- \rightarrow NO_2$) and therefore the nitrate ions $NO_3^-$ in the $NO_x$ absorbent 47 are released in the form of $NO_2$ from the $NO_x$ absorbent 47. Next, the released $NO_x$ is reduced by the unburned HC and CO contained in the exhaust gas.

When the air-fuel ratio of the exhaust gas is lean in this way, that is, when combustion is performed under a lean air-fuel ratio, the $NO_x$ in the exhaust gas is absorbed in the $NO_x$ absorbent 47. However, if combustion is continuously performed under a lean air-fuel ratio, the $NO_x$ absorbent 47 eventually ends up becoming saturated in its $NO_x$ absorption ability and therefore the $NO_x$ absorbent 47 can no longer absorb $NO_x$. Therefore, in the embodiment according to the present invention, before the $NO_x$ absorbent 47 becomes saturated in absorption ability, fuel is fed from the fuel feed valve 17 so as to make the air-fuel ratio of the exhaust gas temporarily rich and thereby make the $NO_x$ absorbent 47 release $NO_x$.

However, the exhaust gas contains $SO_x$, that is, $SO_2$. When this $SO_2$ flows into the particulate filter 13 and $NO_x$ storing and reducing catalyst 15, this $SO_2$ is oxidized at the platinum Pt 46 and becomes $SO_3$. Next, this $SO_3$ is absorbed in the $NO_x$ absorbent 47 and bonds with the barium oxide BaO while being diffused in the form of sulfate ions $SO_4^{2-}$ in the $NO_x$ absorbent 47 so as to form the stable sulfate $BaSO_4$. However, the $NO_x$ absorbent 47 has a strong basicity, so this sulfate $BaSO_4$ is stable and hard to break down. By just making the air-fuel ratio of the exhaust gas rich, the sulfate $BaSO_4$ remains as it is without being broken down. Therefore, in the $NO_x$ absorbent 47, the sulfate $BaSO_4$ increases along with the elapse of time and therefore as time elapses, the amount of $NO_x$ which the $NO_x$ absorbent 47 can absorb falls.

Note that, in this case, if making the air-fuel ratio of the exhaust gas flowing into the $NO_x$ storing and reducing catalyst rich in the state raising the temperature of the $NO_x$ storing and reducing catalyst to the 600° C. or higher $SO_x$ release temperature, $SO_x$ will be released from the $NO_x$ absorbent 47. However, in this case, the $SO_x$ will only be released from the $NO_x$ absorbent 47 a little at a time. Therefore, to make the $NO_x$ absorbent 47 release all of the absorbed $SO_x$, it is necessary to make the air-fuel ratio rich over a long period of time. Therefore, a large amount of fuel becomes required. Therefore, in the embodiment shown in FIG. 1, an $SO_x$ trapping catalyst 11 is arranged upstream of the particulate filter 13, this $SO_x$ trapping catalyst 11 is used to trap the $SO_x$ contained in the exhaust gas, and thereby $SO_x$ is prevented from flowing into the particulate filter 13 and $NO_x$ storing and reducing catalyst 15. Next, this $SO_x$ trapping catalyst 11 will be explained.

Figure 4:
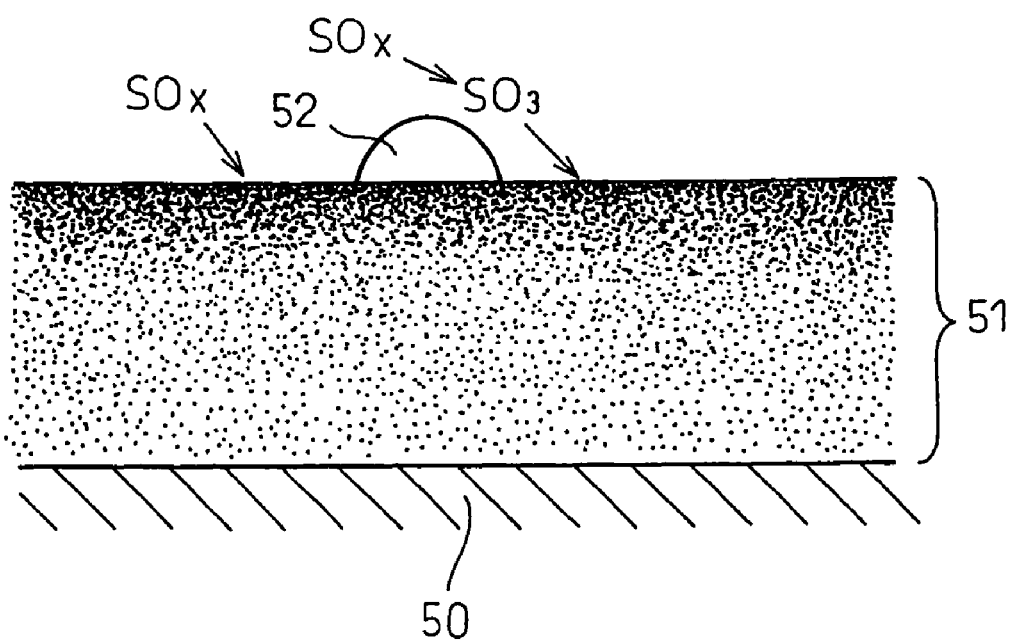
FIG. 4 is a cross-sectional view of a surface part of the catalyst carrier of an $SO_x$ trapping catalyst.

This $SO_x$ trapping catalyst 11 is for example comprised of a monolith catalyst of a honeycomb structure which has a large number of exhaust gas flow holes extending straight in the axial direction of the $SO_x$ trapping catalyst 11. When forming the $SO_x$ trapping catalyst 11 from a monolith catalyst of a honeycomb structure in this way, a catalyst carrier comprised of for example alumina is carried on the inner circumferential walls of the exhaust gas flow holes. FIG. 4 illustrates the cross-section of the surface part of this catalyst carrier 50. As shown in FIG. 4, the surface of the catalyst carrier 50 is formed with a coated layer 51. The surface of this coated layer 51 carries the precious metal catalyst 52 diffused in it.

In the embodiment shown in FIG. 1, platinum is used as the precious metal catalyst 52. As the component forming the coated layer 51, for example, at least one element selected from potassium K, sodium Na, cesium Cs, or another alkali metal, barium Ba, calcium Ca, or another alkali earth, lanthanum La, yttrium Y, or another rare earth is used. That is, the coated layer 51 of the $SO_x$ trapping catalyst 11 exhibits a strong basicity.

Now, the $SO_x$ contained in the exhaust gas, that is, the $SO_2$, as shown in FIG. 4, is oxidized at the platinum Pt 52 then is trapped in the coated layer 51. That is, the $SO_2$ diffuses in the form of sulfate ions $SO_4^{2-}$ in the coated layer 51 to form a sulfate. Note that as explained above, the coated layer 51 exhibits a strong basicity, therefore as shown in FIG. 4, part of the $SO_2$ contained in the exhaust gas is directly trapped in the coated layer 51.

The shading in the coated layer 51 in FIG. 4 shows the concentration of the trapped $SO_x$. As will be understood from FIG. 4, the $SO_x$ concentration in the coated layer 51 becomes highest near the surface of the coated layer 51 and gradually decreases the further to the inside. If the $SO_x$ concentration near the surface of the coated layer 51 becomes higher, the surface of the coated layer 51 becomes weaker in basicity and the ability to trap $SO_x$ is weakened. Here, if referring to the ratio of the $SO_x$ trapped by the $SO_x$ trapping catalyst 11 to the $SO_x$ included in the exhaust gas as the "$SO_x$ trap rate", if the basicity of the surface of the coated layer 51 becomes weaker, the $SO_x$ trap rate will fall along with this.

Figure 5:
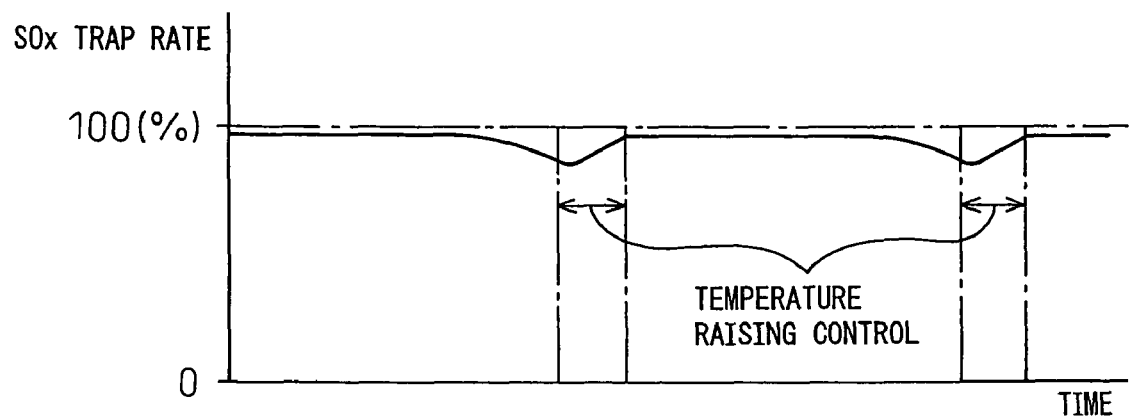
FIG. 5 is a view showing an SOx trap rate.

FIG. 5 shows the change in the $SO_x$ trap rate along with time. As shown in FIG. 5, the $SO_x$ trap rate is first close to 100 percent, but as time elapses, the $SO_x$ trap rate rapidly falls. Therefore, as shown in FIG. 5, when the $SO_x$ trap rate falls by more than a predetermined rate, temperature raising control is performed to raise the temperature of the $SO_x$ trapping catalyst 11 under a lean air-fuel ratio of the exhaust gas to thereby restore the $SO_x$ trap rate.

That is, if raising the temperature of the $SO_X$ trapping catalyst 11 under a lean air-fuel ratio of the exhaust gas, the $SO_X$ concentrated present near the surface in the coated layer 51 diffuses to the inside of the coated layer 51 so that the $SO_X$ concentration in the coated layer 51 becomes uniform. That is, the nitrates formed in the coated layer 51 change from the unstable state where they concentrate near the surface of the coated layer 51 to a stable state where they are uniformly diffused throughout the entire coated layer 51. If the $SO_X$ present near the surface in the coated layer 51 diffuses toward the inside of the coated layer 51, the concentration of $SO_X$ near the surface of the coated layer 51 falls and therefore when the temperature raising control of the $SO_X$ trapping catalyst 11 ends, as shown in FIG. 5, the $SO_X$ trap rate is restored.

When performing temperature raising control of the $SO_X$ trapping catalyst 11, if making the temperature of the $SO_X$ trapping catalyst 11 about 450° C., the $SO_X$ near the surface of the coated layer 51 can be made to diffuse inside the coated layer 51. If raising the temperature of the $SO_X$ trapping catalyst 11 to 600° C. or so, the concentration of $SO_X$ inside the coated layer 51 can be made considerably uniform. Therefore, at the time of temperature raising control of the $SO_X$ trapping catalyst 11, it is preferable to raise the temperature of the $SO_X$ trapping catalyst 11 to 600° C. or so under a lean air-fuel ratio of the exhaust gas.

Note that if making the air-fuel ratio of the exhaust gas rich when raising the temperature of the $SO_x$ trapping catalyst 11, the $SO_x$ trapping catalyst 11 ends up releasing $SO_x$. Therefore, when raising the temperature of the $SO_x$ trapping catalyst 11, the air-fuel ratio of the exhaust gas must not be made rich. Further, when the $SO_x$ concentration near the surface of the coated layer 51 becomes high, even if not raising the temperature of the $SO_x$ trapping catalyst 11, if making the air-fuel ratio of the exhaust gas rich, the $SO_x$ trapping catalyst 11 will end up releasing $SO_x$. Therefore, when the temperature of the $SO_x$ trapping catalyst 11 is the temperature which can release $SO_x$ or more, the air-fuel ratio of the exhaust gas flowing into the $SO_x$ trapping catalyst 11 is not made rich.

In the embodiment shown in FIG. 1, basically it is considered that the $SO_X$ trapping catalyst 11 will be used as it is without replacement from the purchase of the vehicle to its scrapping. In recent years, in particular, the amount of sulfur contained in fuel has been reduced. Therefore, if increasing the capacity of the $SO_X$ trapping catalyst 11 to a certain extent, the $SO_X$ trapping catalyst 11 can be used without replacement until scrapping. For example, if the durable running distance of the vehicle is made 500,000 km, the capacity of the $SO_X$ trapping catalyst 11 is made a capacity whereby the $SO_X$ can continue to be trapped by a high $SO_X$ trap rate without temperature raising control until the running distance becomes 250,000 km or so. In this case, the initial temperature raising control is performed when the running distance becomes 250,000 km or so.

Figure 6:
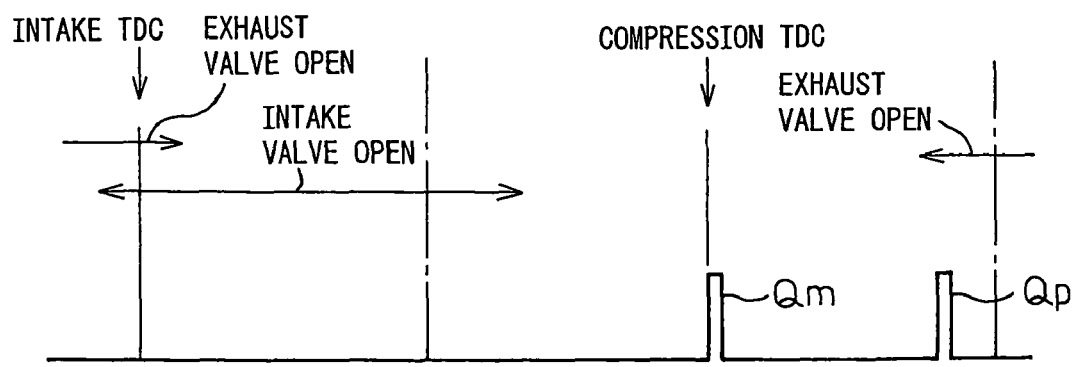
FIG. 6 is a view showing an injection timing.

The temperature of the $SO_x$ trapping catalyst 11 is raised, for example, as shown in FIG. 6, by injecting, in addition to the combustion use main fuel $Q_m$, post-treatment use auxiliary fuel $Q_p$ during the expansion stroke or the exhaust stroke. That is, in this case, the major part of the auxiliary fuel $Q_p$ is exhausted into the exhaust passage without being burned in the form of unburnt HC. This unburnt HC is oxidized by the excess oxygen on the $SO_x$ trapping catalyst 11. The heat of oxidation reaction at this time causes the temperature of the $SO_x$ trapping catalyst 11 to rise.

Figure 7:
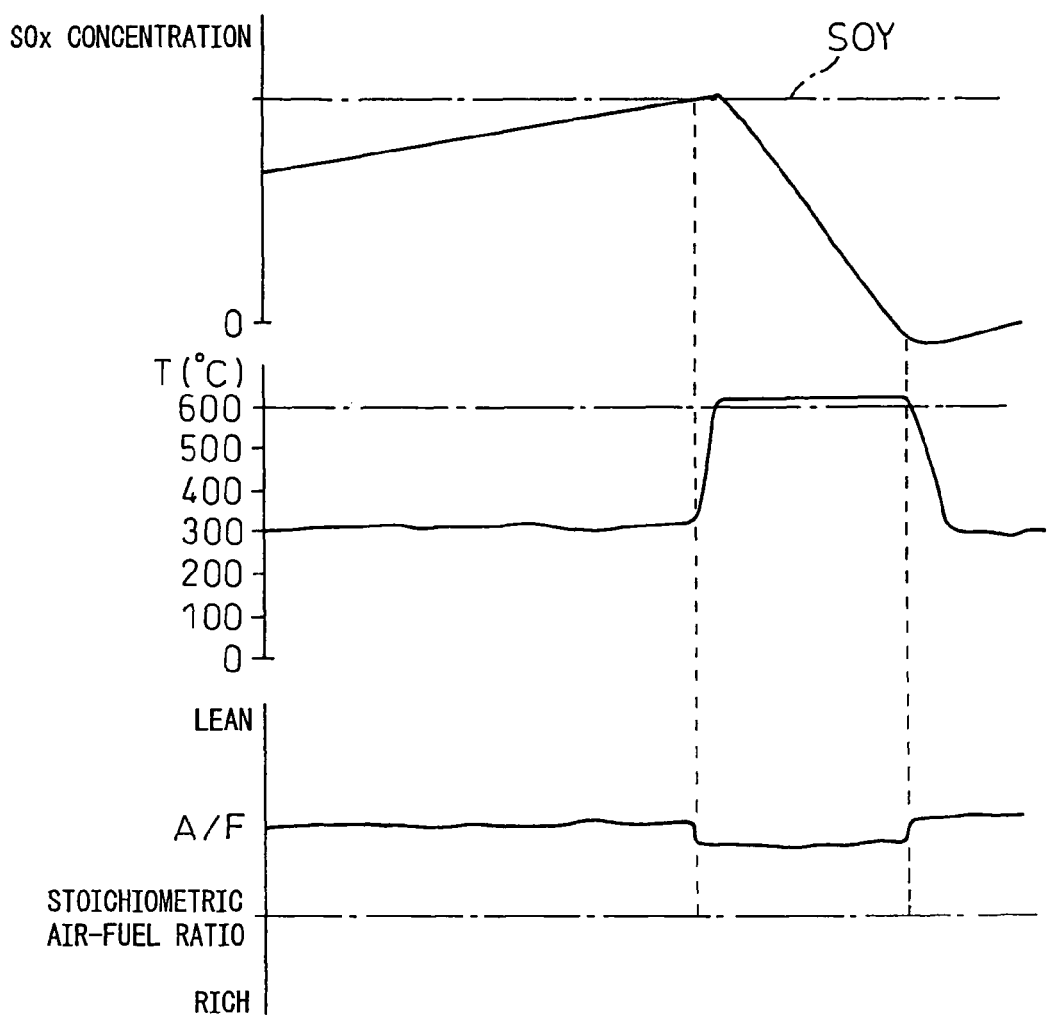
FIG. 7 is a time chart showing $SO_x$ stabilization processing.

FIG. 7 shows a time chart of an example of $SO_x$ stabilization processing in the $SO_x$ trapping catalyst 11. In this example, an $SO_x$ sensor is used as the sensor 18 arranged downstream of the $SO_x$ trapping catalyst 11. This $SO_x$ sensor 18 detects the $SO_x$ concentration in the exhaust gas flowing out from the $SO_x$ trapping catalyst 11. That is, in this example, as shown in FIG. 7, when the $SO_x$ concentration in the exhaust gas detected by the $SO_x$ sensor 18 exceeds a predetermined concentration SOY, it is judged that the $SO_x$ trap rate has fallen below a predetermined rate. At this time, temperature raising control is performed raising the temperature of the $SO_x$ trapping catalyst 11 under a lean air-fuel ratio A/F of the exhaust gas so as to restore the $SO_x$ trap rate.

Next, the treatment of the $NO_x$ storing and reducing catalyst carried on the particulate filter 13 and the $NO_x$ storing and reducing catalyst 15 will be explained with reference to FIG. 8 and FIG. 9. In the embodiment shown in FIG. 1, the $NO_x$ amount NOXA absorbed per unit time in the $NO_x$ absorbent 47 of the $NO_x$ storing and reducing catalyst carried on the particulate filter 13 and the $NO_x$ absorbent 47 of the $NO_x$ storing and reducing catalyst 15 is stored as a function of the required torque TQ and engine speed N in the form of the map shown in FIG. 8 in advance in the ROM 32. This $NO_x$ amount NOXA is integrated to calculate the $NO_x$ amount ΣNOX absorbed in the $NO_x$ absorbent 47. Further, in this embodiment, as shown in FIG. 9, the air-fuel ratio A/F of the exhaust gas flowing into the particulate filter 13 is temporarily made rich each time this $NO_x$ amount ΣNOX reaches the allowable value NX and thereby the $NO_x$ absorbent 47 releases $NO_x$.

Note that when making the air-fuel ratio A/F of the exhaust gas flowing into the particulate filter 13 rich, the air-fuel ratio of the exhaust gas flowing into the $SO_x$ trapping catalyst 11 has to be maintained lean. Therefore, in the embodiment shown in FIG. 1, a fuel feed valve 17 is arranged in the exhaust pipe 12 between the $SO_x$ trapping catalyst 11 and the particulate filter 13. When the $NO_x$ absorbent 47 should release $NO_x$, this fuel feed valve 17 feeds the exhaust pipe 12 with fuel, that is, post-treatment use fuel, to thereby make the air-fuel ratio of the exhaust gas flowing into the particulate filter 13 temporarily rich.

On the other hand, the particulate, that is, the particulate matter, contained in the exhaust gas is trapped on the particulate filter 13 and successively oxidized. However, when the amount of trapped particulate matter becomes greater than the amount of oxidized particulate matter, the particulate matter is gradually deposited on the particulate filter 13. In this case, if the amount of deposition of the particulate matter increases, a drop in the engine output ends up being incurred. Therefore, when the amount of deposition of the particulate matter increases, it is necessary to remove the deposited particulate matter. In this case, if raising the temperature of the particulate filter 13 to about 600° C. under an excess of air, the deposited particulate matter is oxidized and removed.

Therefore, in the embodiment shown in FIG. 1, when the amount of particulate matter deposited on the particulate filter 13 exceeds an allowable amount, the temperature of the particulate filter 13 is raised under a lean air-fuel ratio of the exhaust gas and thereby the deposited particulate matter is removed by oxidation. Specifically, when the differential pressure ΔP before and after the particulate filter 13 detected by the differential pressure sensor 27 exceeds the allowable value PX as shown in FIG. 9, the amount of deposited particulate matter is judged to have exceeded the allowable amount. At this time, temperature raising control is performed to maintain the air-fuel ratio of the exhaust gas flowing into the particulate filter 13 lean while raising the temperature T of the particulate filter 13. Note that when the temperature T of the particulate filter 13 rises, $NO_x$ is released from the $NO_x$ absorbent 47, so the trapped $NO_x$ amount ΣNOX decreases.

When raising the temperature of the particulate filter 13, it is not necessary to raise the temperature of the $SO_x$ trapping catalyst 11. Therefore, when raising the temperature of the particulate filter 13, fuel, that is, post-treatment use fuel, is fed from the fuel feed valve 17 in the range where the air-fuel ratio of the exhaust gas can be maintained lean. The heat of oxidation reaction of this fuel is used to raise the temperature T of the particulate filter 13.

On the other hand, when the $SO_x$ trap rate by the $SO_x$ trapping catalyst 11 is 100 percent, no $SO_x$ at all flows into the $NO_x$ absorbent 47. Therefore, in this case, there is no danger at all of the $NO_x$ absorbent 47 absorbing $SO_x$. As opposed to this, when the $SO_x$ trap rate is not 100 percent, even if the $SO_x$ trap rate is close to 100 percent, the $SO_x$ will be absorbed by the $NO_x$ absorbent 47. However, in this case, the amount of $SO_x$ absorbed in the $NO_x$ absorbent 47 per unit time is extremely low. This being said, if a long time elapses, a large amount of $SO_x$ will be absorbed by the $NO_x$ absorbent 47. If a large amount of $SO_x$ is absorbed, the absorbed $SO_x$ will have to be made to be released.

Figure 10:
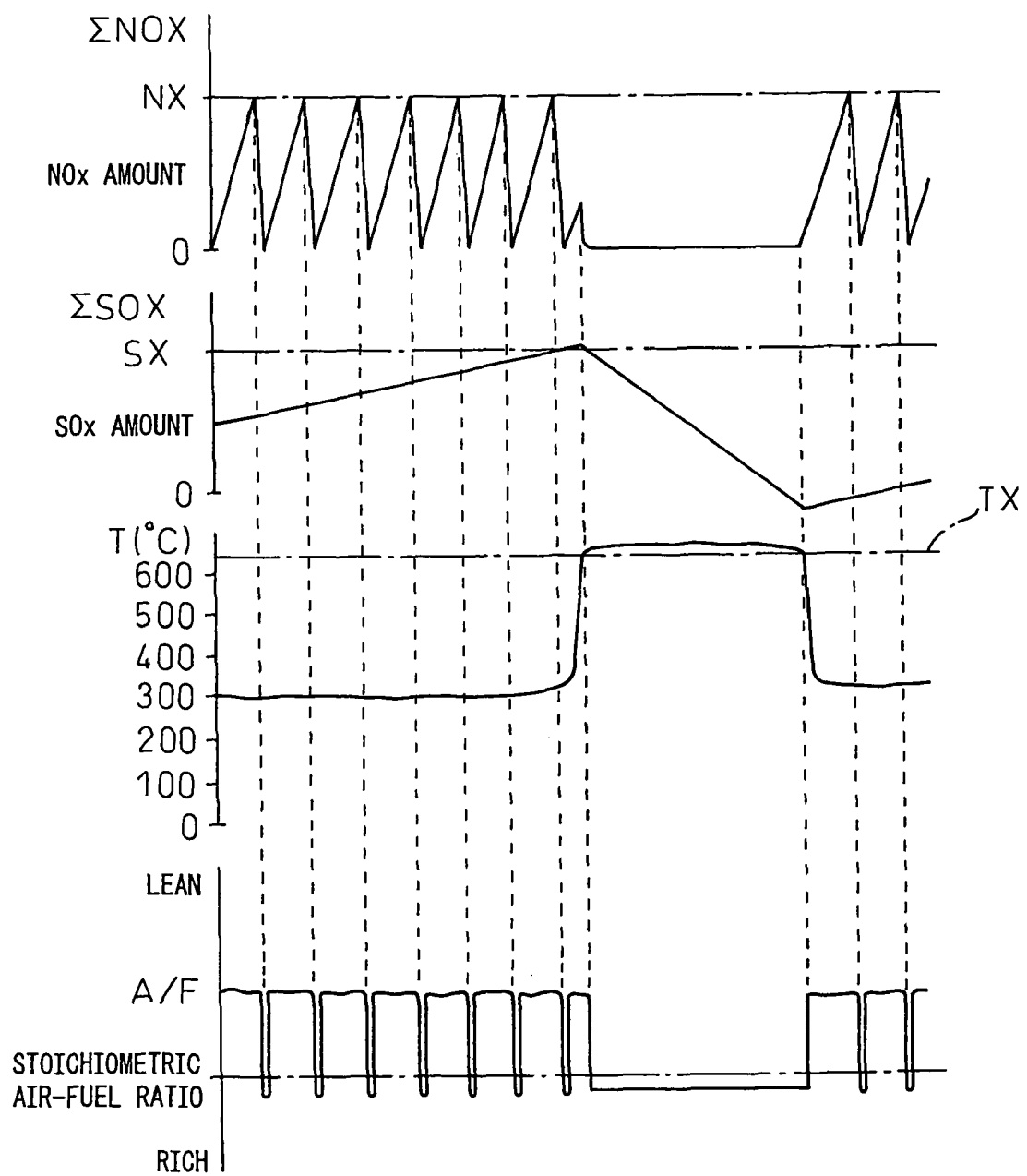
FIG. 10 is a time chart showing $SO_x$ release control, FIG. 11 are views showing the relationship between operating parameters and the amount of generation of $NO_x$ etc., FIG. 12 are views showing the amount of combustion of post-treatment use fuel.

As explained above, to make the $NO_x$ absorbent 47 release $SO_x$, it is necessary to raise the temperature of the $NO_x$ absorbent 47 up to the $SO_x$ release temperature and to make the air-fuel ratio of the exhaust gas flowing into the particulate filter 13 rich. Therefore, in the example shown in FIG. 10, when the $SO_x$ amount ΣSOX absorbed in the $NO_x$ absorbent 47 reaches the allowable value SX, the temperature T of the $NO_x$ absorbent 47 is made to rise to the $SO_x$ release temperature TX and the air-fuel ratio of the exhaust gas flowing into the particulate filter 13 is made rich. Note that in this example, in addition to the sensor 18, the sensor 20 is also made from an $SO_x$ sensor. The $SO_x$ amount SOXZ absorbed in the $NO_x$ absorbent 47 per unit time is found from the difference between the $SO_x$ concentration detected by the $SO_x$ sensor 18 and the $SO_x$ concentration detected from the $SO_x$ sensor 20. By cumulatively adding this $SO_x$ amount SOXZ, the absorbed $SO_x$ amount ΣSOX is calculated.

When making the $NO_x$ absorbent 47 release the $SO_x$, it is not possible to make the air-fuel ratio of the exhaust gas flowing into the $SO_x$ trapping catalyst 11 rich. Therefore, in the embodiment shown in FIG. 1, when the $NO_x$ absorbent 47 should release $SO_x$, first, while maintaining the air-fuel ratio of the exhaust gas flowing into the $SO_x$ trapping catalyst 11 and particulate filter 13 lean, the fuel feed valve 17 feeds fuel, that is, post-treatment use fuel, to make the temperature T of the $NO_x$ absorbent 47 rise to the $SO_x$ release temperature TX, then, while maintaining the air-fuel ratio of the exhaust gas flowing into the $SO_x$ trapping catalyst 11 lean, the fuel feed valve 17 increases the amount of feed of fuel, that is, the post-treatment use fuel, to make the air-fuel ratio of the exhaust gas flowing into the particulate filter 13 rich. Note that in this case it is also possible to alternately switch the air-fuel ratio of the exhaust gas flowing into the particulate filter 13 between rich and lean.

In this way, in this embodiment of the present invention, various post-treatment use fuels are used for treating the $NO_x$, $SO_x$, or particulate. In this case, as explained at the start, for example, if setting the engine to an operating state where the amount of $NO_x$ generated in the combustion chambers 2 increases, the amount of consumption of the combustion use fuel decreases, but the amount of consumption of post-treatment use fuel increases, but conversely if setting the engine in an operating state where the amount of $NO_x$ generated in the combustion chambers 2 decreases, the amount of consumption of the combustion use fuel increases, but the amount of consumption of post-treatment use fuel decreases.

However, maintaining the amounts of $NO_x$ and other harmful components exhausted into the atmosphere at below the regulatory values is an absolute condition. On the other hand, the amount of consumption of fuel per set driving distance has to be reduced as much as possible. Therefore, in the present invention, the total amount of consumption of the combustion use fuel and post-treatment use fuel per predetermined driving distance is minimized under the absolute condition of maintaining the harmful components in the exhaust gas at below the regulatory values in this way.

In explaining the present invention, first, the relationship between the amount of consumption of the combustion use fuel and the amount of harmful components generated in the combustion chambers 2 will be explained while referring to FIGS. 11(A) and (B). Note that as the harmful components, there are unburnt HC, CO, $NO_x$, particulate, etc., but FIGS. 11(A) and (B) show $NO_x$ and particulate matter PM as ones representing the harmful components. On the other hand, the amount of consumption of the combustion use fuel and amount of harmful components generated in the combustion chambers become functions of the engine operating parameters. There are also various operating parameters, but FIGS. 11(A) and (B) show the representative operating parameters of the injection timing of the combustion use fuel and exhaust gas recirculation rate, that is, the EGR rate.

Standard values of the values of the operating parameters of the engine are set for the black dots determined from the required torque TQ and engine speed. N shown in FIG. 11(C). The B's in FIGS. 11(A) and (B) show the standard values of the operating parameters at certain black dots in FIG. 11(C), that is, the standard value of the injection timing and the standard value of the EGR rate. Note that the values of the operating parameters between the black dots in FIG. 11(C) are found by proportional distribution.

Figure 11:
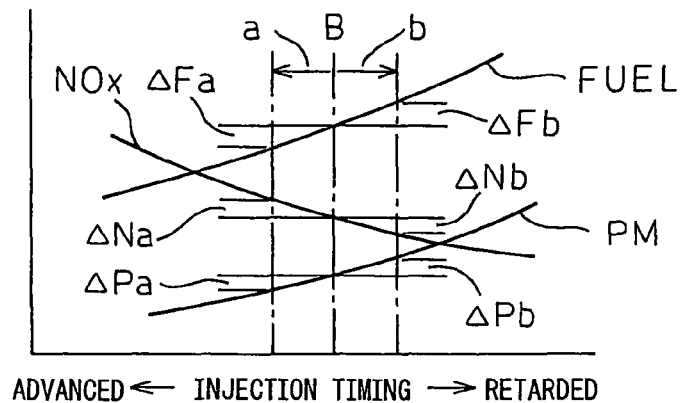
Figure 11:
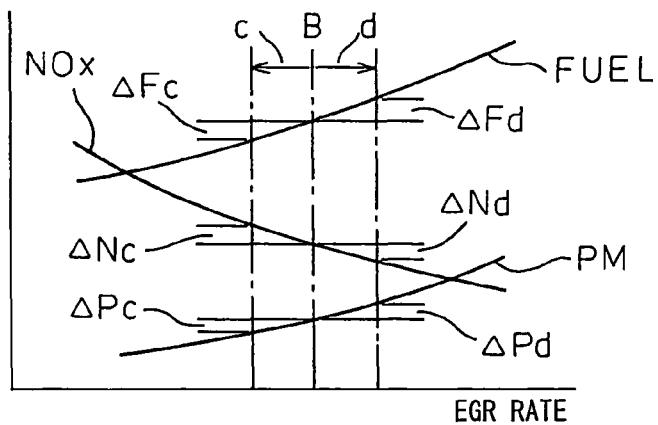
Figure 11:
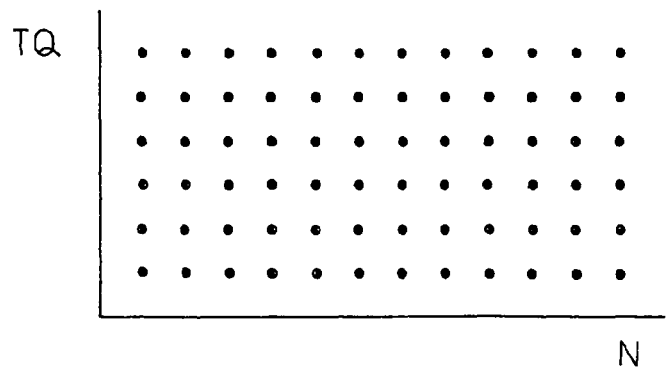

If advancing the injection timing of the combustion use fuel, the combustion temperature rises, so, as shown in FIG. 11(A), the amount of generation of $NO_x$ increases, but the combustion efficiency rises, so the amount of consumption of combustion use fuel FUEL for generating the same output decreases and the amount of generation of particulate matter PM also decreases. Conversely, if retarding the injection timing of the combustion use fuel, the combustion temperature falls, so the amount of generation of $NO_x$ decreases, but the combustion efficiency falls, so the amount of consumption of combustion use fuel FUEL for generating the same output increases and the amount of generation of particulate matter PM also increases.

The amount of increase ΔNa of the $NO_x$, the amount of decrease ΔFa of the combustion use fuel FUEL, the amount of decrease ΔPa of the particulate matter PM when advancing the injection timing by exactly "a" in FIG. 11(A), and the amount of decrease ΔNb, the amount of increase ΔFb of the combustion use fuel FUEL, the amount of increase ΔPb of the particulate PM when retarding the injection timing by exacty "b", are stored in advance for the black dots of FIG. 11(C).

On the other hand, if reducing the EGR rate, the combustion temperature rises, so as shown in FIG. 11(B), the amount of generation of NOx increases, but the combustion efficiency rises, so the amount of consumption of the combustion use fuel FUEL for generating the same output decreases and the amount of generation of particulate matter PM decreases. Conversely to this, if increasing the EGR rate, the combustion temperature falls, so the amount of generation of $NO_x$ decreases, but the amount of consumption of combustion use fuel FUEL for generating the same output increases and the amount of generation of particulate matter PM also increases.

The amount of increase ΔNc of the $NO_x$, the amount of decrease ΔFc of the combustion use fuel FUEL, the amount of decrease ΔPc of the particulate matter PM when reducing the EGR rate by exactly "c" in FIG. 11(B), and the amount of decrease ΔNd of $NO_x$, the amount of increase ΔFd of the combustion use fuel FUEL, the amount of increase ΔPd of the particulate matter PM when increasing the EGR rate by exactly "d", are stored in advance for the black dots of FIG. 11(C).

Note that in practice the relationship between the injection timing and amounts of generation of other harmful components such as unburnt HC, CO, etc., the relationship between the EGR rate and amounts of generation of other harmful components such as unburnt HC, CO, etc., and the relationship among the water temperature and other operating parameters, the amount of consumption of the combustion use fuel FUEL, and the amounts of generation of $NO_x$, PM, HC, CO, etc. are stored in advance for the black dots of FIG. 11(C).

In the present invention, when resetting the values of the operating parameters at the black dots in FIG. 11(C), the amounts of generation of harmful components and the amount of consumption of the combustion use fuel FUEL when changing the values of the operating parameters such as the injection timing, EGR rate, etc in various ways in an increasing direction or decreasing direction are found from the relationships shown in FIGS. 11(A) and (B) for the operating states when assuming operation of the engine by a preset vehicle driving mode. Then the total amount of the amounts of generation of the harmful components in the exhaust gas and the total amount of consumption of the combustion use fuel FUEL when operation in the preset vehicle driving mode has been completed are found for cases of changing the values of the operating parameters in various ways.

Figure 12:
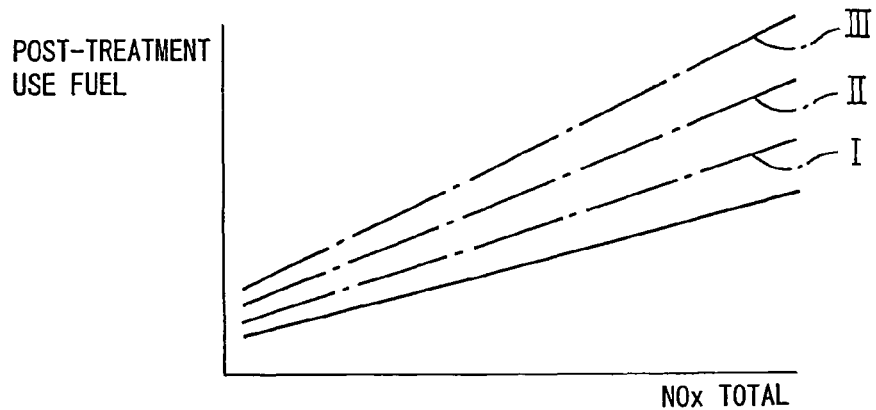
Figure 12:
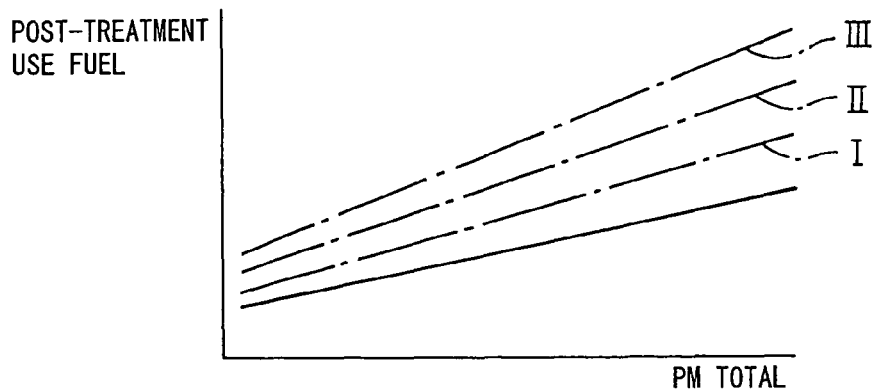
Figure 12:
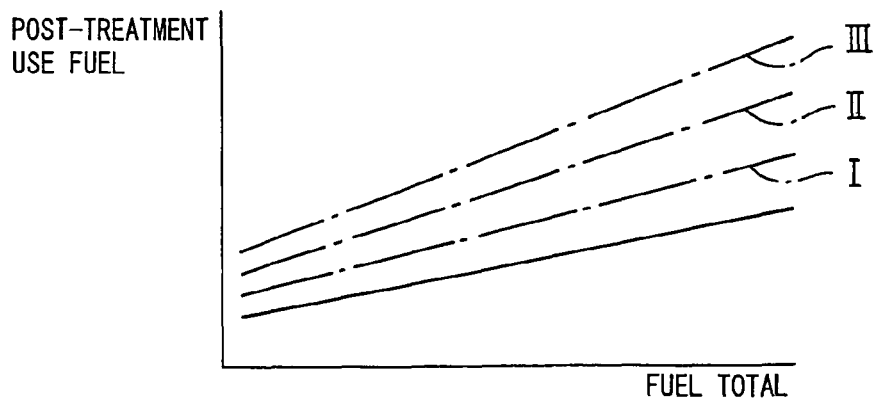

FIG. 12 shows representative examples of the relationships among the total amount of generation of these harmful components, the total amount of consumption of the combustion use fuel FUEL, and the amount of consumption of post-treatment use fuel. That is, FIG. 12(A) shows the relationship between the total amount of $NO_x$ generated in the combustion chambers 2 and the amount of consumption of post-treatment use fuel, FIG. 12(B) shows the relationship between the total amount of the particulate matter PM generated in the combustion chambers 2 and the amount of consumption of post-treatment use fuel, and FIG. 12(C) shows the relationship between the total amount of the amount of consumption of the combustion use fuel FUEL and the amount of consumption of post-treatment use fuel.

Note that in FIGS. 12(A), (B), and (C), the solid lines show the amount of consumption of post-treatment use fuel when the post-treatment system is new, while the dash and dot lines I, II, and III show the amount of consumption of post-treatment use fuel when the post-treatment system has deteriorated. Here, the dash and dot line II shows the case where the degree of deterioration of the post-treatment system is higher than the dash and dot line I, while the dash and dot line III shows the case where the degree of deterioration of the post-treatment system is higher than the dash and dot line II.

If the amount of $NO_x$ generated in the combustion chambers 2 increases, the frequency by which the fuel feed valve 17 feeds fuel so as to make the $NO_x$ absorbent 47 of the post-treatment system release $NO_x$ becomes higher. As a result, as shown in FIG. 12(A), the amount of consumption of post-treatment use fuel increases. Further, if the degree of deterioration of the post-treatment system becomes higher, the reduction ability of the $NO_x$ released from the $NO_x$ absorbent 47 when feeding fuel becomes weaker and therefore a large amount of fuel becomes necessary for sufficiently reducing the released $NO_x$. Therefore, as shown in FIG. 12(A), the higher the degree of deterioration of the post-treatment system, the greater the amount of consumption of post-treatment use fuel.

On the other hand, if the amount of particulate matter PM generated in the combustion chambers 2 increases, the frequency of the fuel feed valve 17 feeding fuel so as to raise the temperature of the post-treatment system, that is, the particulate filter 13, rises. As a result, as shown in FIG. 12(B), the amount of consumption of post-treatment use fuel increases. Further, if the post-treatment system, that is, the particulate filter 13, deteriorates, the deposited particulate matter becomes hard to burn. In this case, to burn off the deposited particulate matter, it is necessary to further raise the temperature of the particulate filter 13. Therefore, as shown in FIG. 12(B), the higher the degree of deterioration of the post-treatment system, the greater the amount of consumption of post-treatment use fuel.

On the other hand, fuel contains sulfur in a certain ratio. Therefore, the greater the total amount of consumption of the combustion use fuel FUEL, the greater the amount of $SO_x$ exhausted from the combustion chambers 2. If the amount of $SO_x$ exhausted from the combustion chambers 2 increases, the frequency by which the fuel feed valve 17 feeds fuel so as to release $SO_x$ from the $NO_x$ absorbent 47 of the post-treatment system becomes higher and, as a result, as shown in FIG. 12(C), the amount of consumption of post-treatment use fuel increases. Further, if the degree of deterioration of the post-treatment system becomes higher, it becomes hard for the $NO_x$ absorbent 47 to release $SO_x$. In this case, to cause the $NO_x$ absorbent 47 to release $SO_x$, it becomes necessary to further raise the temperature of the $NO_x$ absorbent 47. Therefore, as shown in FIG. 12(C), the higher the degree of deterioration of the post-treatment system, the greater the amount of consumption of post-treatment use fuel.

In the present invention, when the values of the operating parameters should be reset, the total amount of consumption of fuel per set driving distance, combining the amount of consumption of the combustion use fuel found from the relationships shown in FIGS. 11(A) and (B) etc. and the amount of consumption of post-treatment use fuel found from the relationships shown in FIGS. 12(A), (B), and (C), is made the smallest when changing the values of the operating parameters in various ways. However, in this case, as explained above, maintaining the amounts of harmful components in the exhaust gas discharged into the atmosphere at below the regulatory values is an absolute condition. In this case, as the regulations the harmful components, there is the case of regulating the amounts of exhaust of the harmful components into the atmosphere in different operating states and the case of regulating the total amount of exhaust of harmful components into the atmosphere when a vehicle is operated in a preset vehicle driving mode. In the former case, regulatory values are set for amounts of exhaust of harmful components into the atmosphere in the different operating states, while in the latter case, regulatory values are set for the total amount of exhaust of harmful components into the atmosphere when the vehicle is operated by a preset vehicle driving mode.

The amounts of the harmful components exhausted into the atmosphere can be detected by several sensors 20 able to detect $NO_x$, HC, CO, particulate matter PM, etc. Further, if inputting the operating parameters etc., it is possible to calculate the amounts of harmful components exhausted into the atmosphere using a vehicle model outputting the amounts of harmful components exhausted into the atmosphere. In this embodiment of the present invention, the amounts of exhaust of the harmful components into the atmosphere in the different operating states and the total amount of exhaust of the harmful components into the atmosphere when the vehicle is driven in a preset vehicle driving mode are calculated using this vehicle model.

Next, the processing routine for resetting the values of the operating parameters will be explained while referring to FIG. 13.

Figure 13:
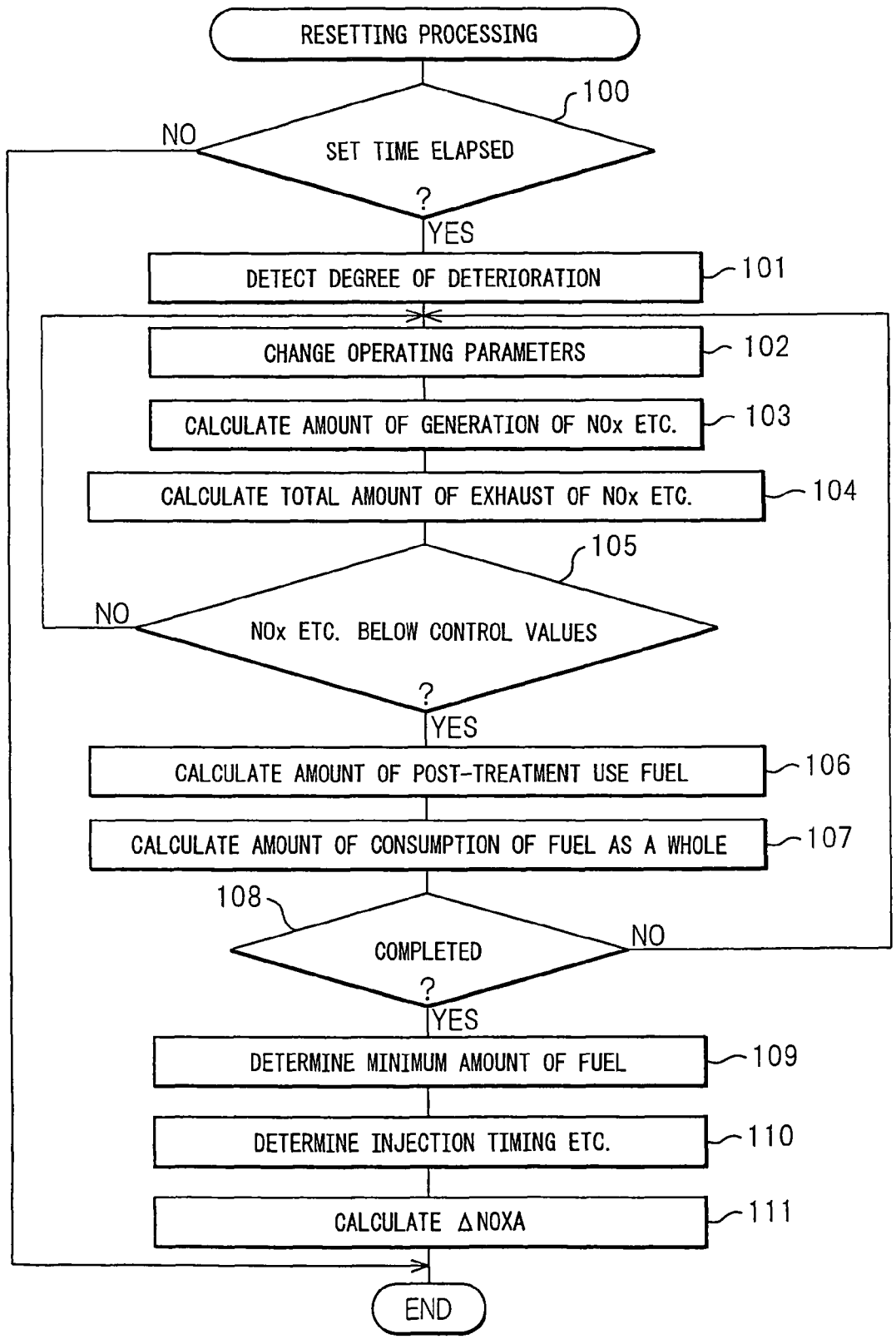
FIG. 13 is a flow chart for resetting values of operating parameters.

Referring to FIG. 13, first, at step 100, it is judged if the operating period of the engine has passed a predetermined time period. In this case, in this embodiment of the present invention, it is judged that the operating period of the engine has passed a predetermined time period when a cumulative driving time of the vehicle, a cumulative driving distance of the vehicle, or a cumulative number of rotations of the engine has exceeded a predetermined set value.

When it is judged at step 100 that the operating period of the engine has passed the predetermined time period, the routine proceeds to step 101, where for example the degree of deterioration of the post-treatment system comprised of the $SO_x$ trapping catalyst 11, particulate filter 13, and $NO_x$ storing and reducing catalyst 15 is detected based on the output signal of the sensor 20. When using an $SO_x$ sensor as the sensor 20, it is judged that the degree of deterioration of the post-treatment system is higher the higher the $SO_x$ concentration in the exhaust gas flowing out from the post-treatment system when the fuel is burned under a lean air-fuel ratio. Next, the routine proceeds to step 102.

Note that the degree of deterioration of the post-treatment system may be continuously detected. In this case, when the degree of deterioration of the post-treatment system exceeds a predetermined degree of deterioration at step 100, it is possible to judge that the operating period of the engine has passed the predetermined time. In this case, when the degree of deterioration of the post-treatment system exceeds a predetermined degree of deterioration, the routine proceeds to step 102.

At step 102, the values of the operating parameters are changed just slightly in accordance with a predetermined rule. For example, the injection timing at a predetermined black dot among the black dots shown in FIG. 11(C) is advanced. Next, at step 103, the total amount of the amount of generation of $NO_x$ in the combustion chambers 2, the total amount of the amount of generation of particulate matter PM in the combustion chambers 2, and the total amount of the amount of consumption of the combustion use fuel when the vehicle is driven in a vehicle driving mode preset based on the relationship shown in FIGS. 11(A), (B), etc. are calculated.

Next, at step 104, using a prestored vehicle model, the amounts of exhaust of the harmful components into the atmosphere in the different operating states and the total amount of exhaust of the harmful components into the atmosphere when the vehicle is driven by the preset vehicle driving mode are calculated. Next, at step 105, it is judged if the amounts of exhaust of these harmful components and the total amount of exhaust are below the regulatory values. When, below the regulatory values, the routine proceeds to step 106. As opposed to this, when the amounts of exhaust of these harmful components and the total amount of exhaust exceed the regulatory values, the routine proceeds to step 102, where the values of the operating parameter are changed.

At step 106, the amount of consumption of post-treatment use fuel corresponding to the degree of deterioration of the post-treatment system is calculated from the relationships shown in FIGS. 12(A), (B), and (C). Next, at step 107, the total amount of consumption of fuel per set driving distance of, combining the total amount of consumption of the combustion use fuel and the amount of consumption of post-treatment use fuel, is calculated. Next, at step 108, it is judged whether all operations changing the values of the operating parameters within predetermined ranges have been completed for all of the operating parameters covered. When not all of the operations have been completed, the routine returns to step 102 where the values of the operating parameters are changed. When all of the operations have been completed, the routine proceeds to step 109.

At step 109, the smallest amount of consumption of fuel per set driving distance is determined. Next, at step 110, the values of the operating parameters at the black dots in FIG. 11(C) when the amount of consumption of fuel per set driving distance becomes smallest are determined. After that, the engine is operated by these determined values of the operating parameters until the resetting processing is again performed.

Figure 8:
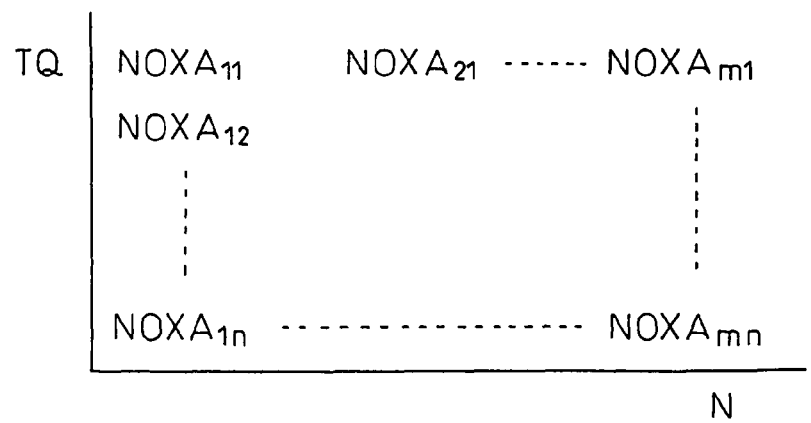
FIG. 8 is a view showing a map of a stored $NO_x$ amount NOXA.
Figure 9:
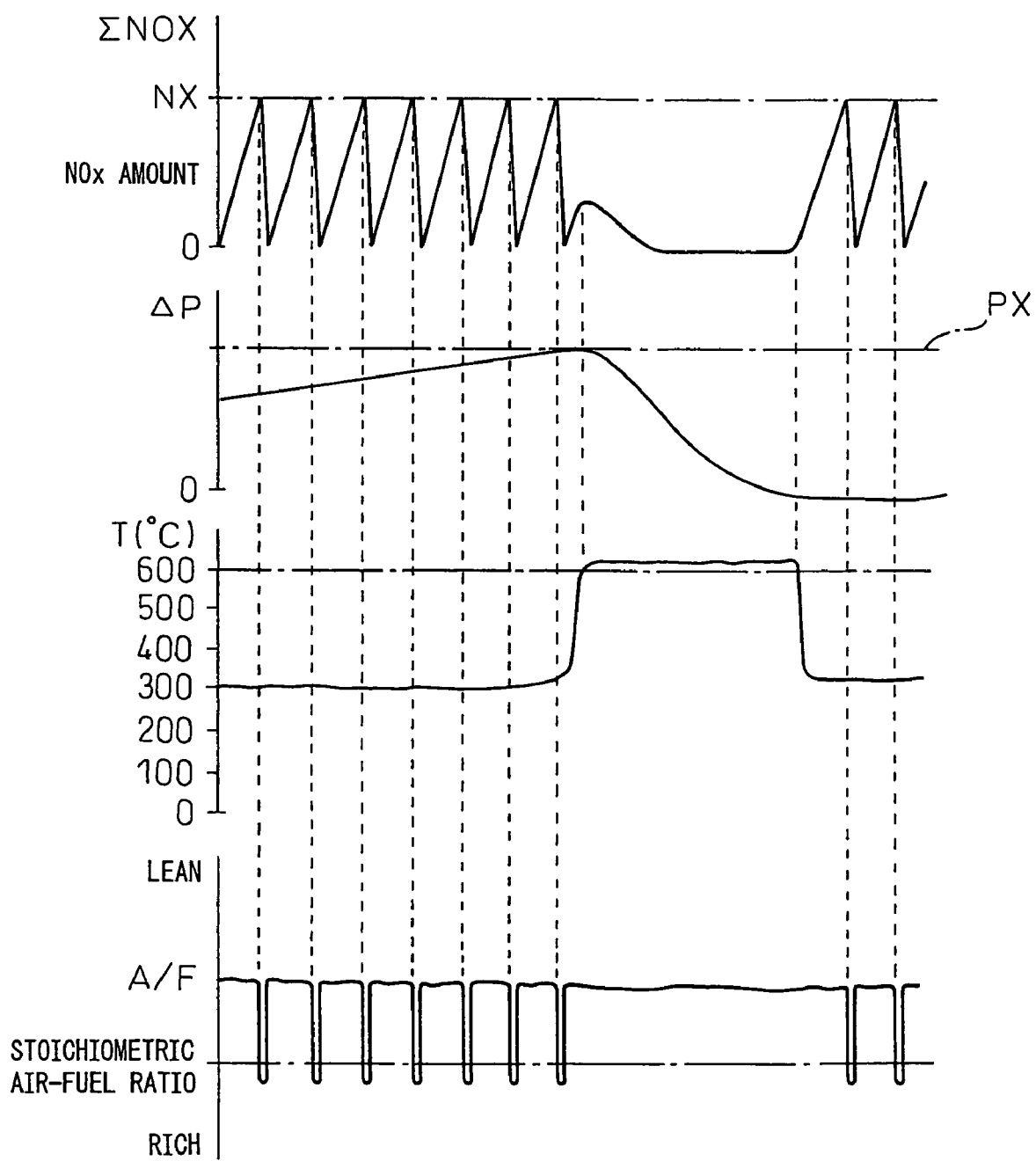
FIG. 9 is a time chart showing $NO_x$ release control and temperature raising control of the particulate filter.
Figure 14:
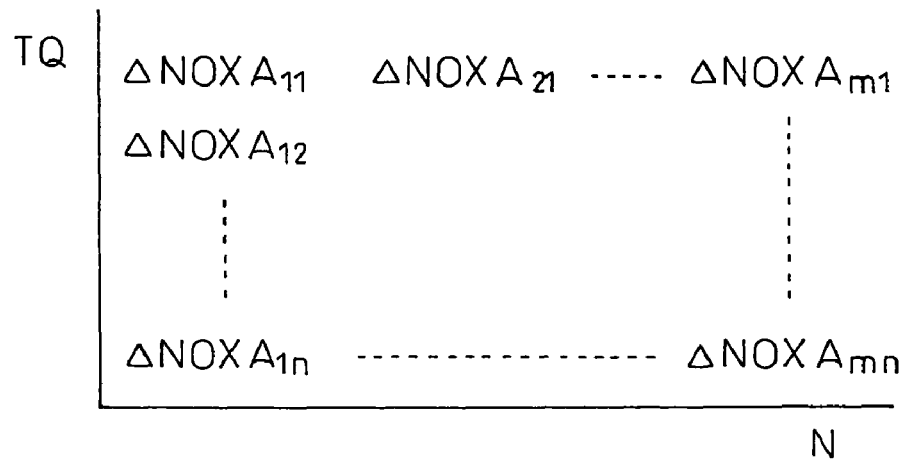
FIG. 14 is a view showing a map of a fluctuation amount $\Delta NOXA$ of an amount of the stored $NO_x$ amount.

In this case, when the values of the operating parameters used up to then continue to be used as they are, the $NO_x$ absorption amount NOXA per unit time shown in FIG. 8 also continues to be used as it is. As opposed to this, when the values of the operating parameters are changed, the $NO_x$ amount generated in the combustion chambers 2 also changes, so the $NO_x$ absorption amount NOXA per unit time also becomes a value different from the $NO_x$ absorption amount NOXA shown in FIG. 8. In the embodiment of the present invention, at step 111 the fluctuation amount ΔNOXA with respect to the $NO_x$ absorption amount NOXA shown in FIG. 8 when the values of the operating parameters have been changed is calculated. This fluctuation amount ΔNOXA is stored as a function of the required torque TQ and engine speed N in the form of the map shown in FIG. 14.

Figure 15:
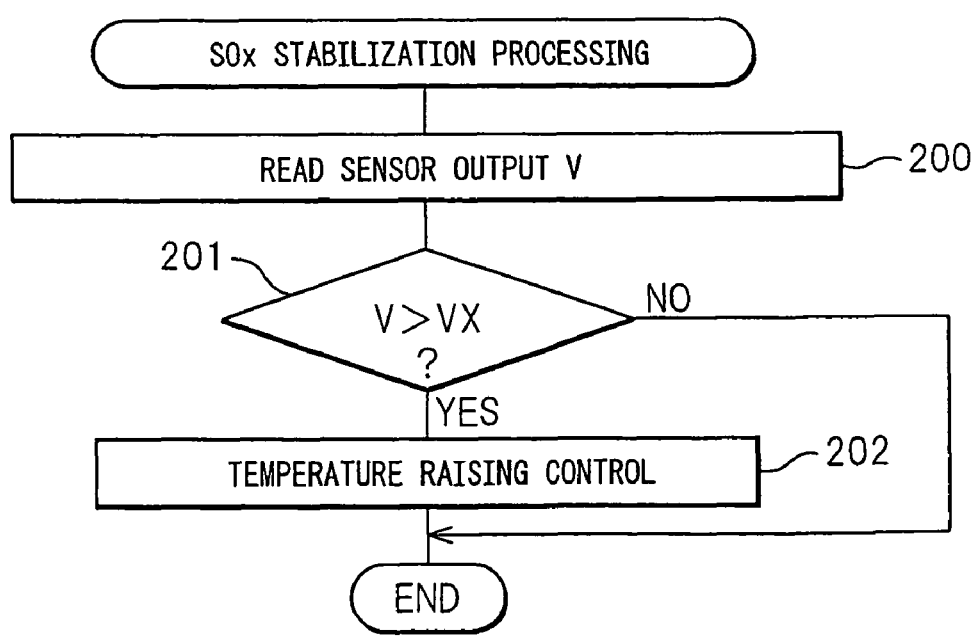
FIG. 15 is a flow chart for executing $SO_x$ stabilization processing.

FIG. 15 shows the routine for stabilization of the SOx absorbed in the $SO_x$ trapping catalyst 11.

Referring to FIG. 15, first, at step 200, the output signal of the $SO_x$ sensor 18, for example, the output voltage V, is read. Next, at step 201, it is judged if the power voltage V of the $SO_x$ sensor 18 exceeds a setting VX, that is, if the $SO_x$ concentration in the exhaust gas exceeds a predetermined concentration SOY. When V>VX, that is, when the $SO_x$ concentration in the exhaust gas exceeds the predetermined concentration SOY, the routine proceeds to step 202, where temperature raising control of the $SO_x$ trapping catalyst 11 is performed.

Figure 16:
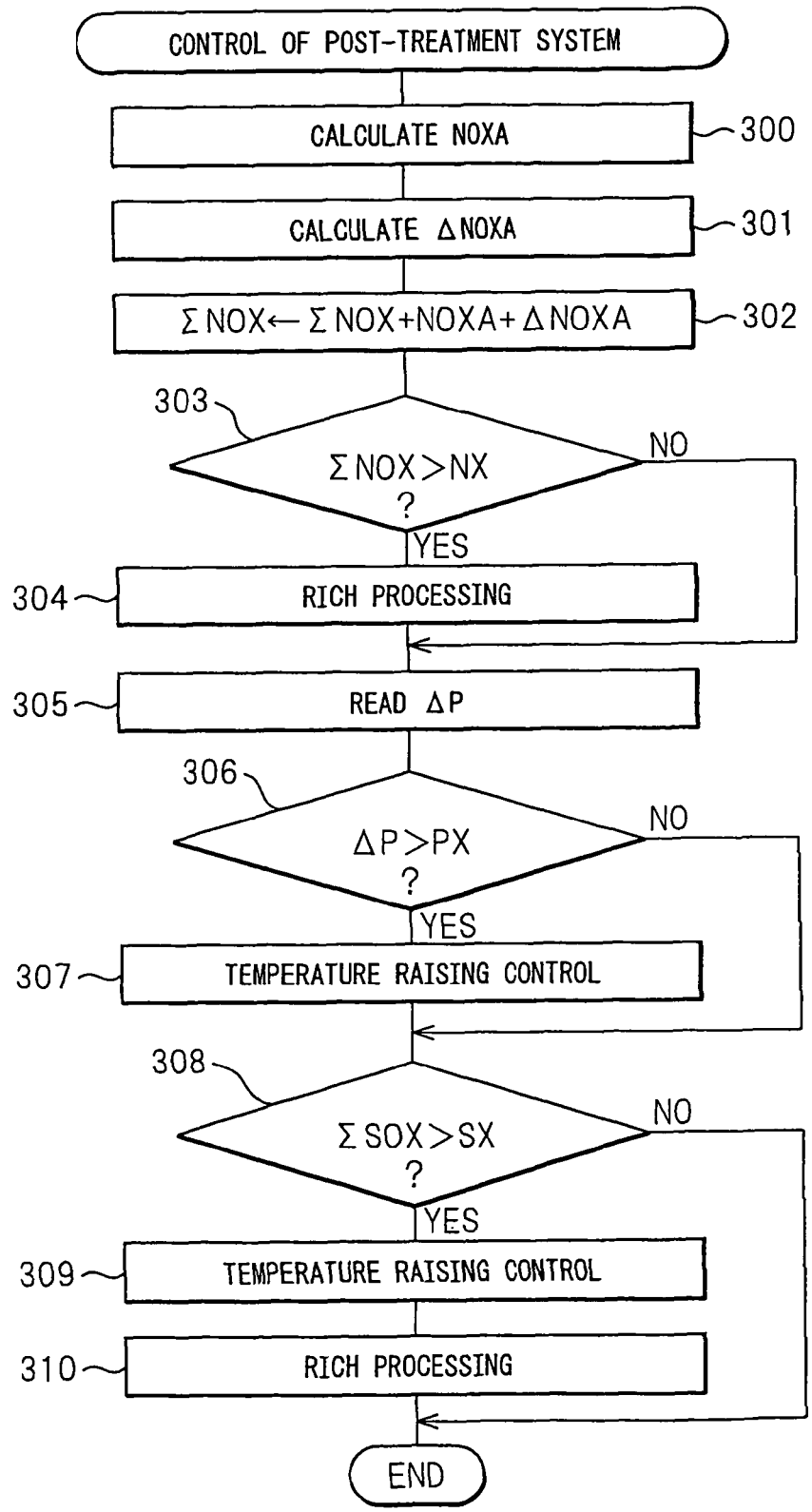
FIG. 16 is a flow chart for control of the post-treatment system.

FIG. 16 shows the control routine of the post-treatment system.

Referring to FIG. 16, first, at step 300, the $NO_x$ amount NOXA stored per unit time is calculated from the map shown in FIG. 8. Next, at step 301, the fluctuation amount ΔNOXA of the $NO_x$ amount stored per unit time is calculated from the map shown in FIG. 14. Next, at step 302, these NOXA and ΔNOXA are added to the $NO_x$ amount ΣNOX stored in the $NO_x$ storing catalyst. Next, at step 303, it is judged whether the stored $NO_x$ amount ΣNOX has exceeded the allowable value NX. When ΣNOX>NX, the routine proceeds to step 304, where rich processing is performed to switch the air-fuel ratio of the exhaust gas flowing into the particulate filter 13 and $NO_x$ storing catalyst 15 temporarily from lean to rich, and ΣNOX is cleared.

Next, at step 305, the differential pressure ΔP before and after the particulate filter 13 is detected by the differential pressure sensor 27. Next, at step 306, it is judged if the differential pressure ΔP has exceeded the allowable value PX. When ΔP>PX, the routine proceeds to step 307, where temperature raising control of the particulate filter 13 is performed. This temperature raising control is performed by feeding fuel from the fuel feed valve 17 while maintaining the air-fuel ratio of the exhaust gas flowing into the particulate filter 13 lean.

Next, at step 308, it is judged if the cumulative value ΣSOX of the $SO_x$ amount SOXZ stored per unit time detected by the $SO_x$ sensors 18 and 20 has exceeded the allowable value SX. When ΣSOX>SX, the routine proceeds to step 309, where temperature raising control is performed to feed fuel from the fuel feed valve 17 while maintaining the air-fuel ratio of the exhaust gas flowing into the particulate filter 13 lean so as to raise the temperature T of the $NO_x$ absorbent 47 to the $SO_x$ release temperature TX. Next, at step 310, rich processing is performed to maintain the air-fuel ratio of the exhaust gas flowing into the particulate filter 13 rich by the fuel fed from the fuel feed valve 17, and ΣSOX is cleared.

When the values of the operating parameters at each operating state are reset, the amounts of generation of $NO_x$, HC, CO, particulate PM, etc. in the combustion chambers 2 change and the amount of feed and frequency of feed of fuel from the fuel feed valve 17 change. That is, the amount of feed and frequency of feed of post-treatment use fuel, that is, the method of feed, are reset.

LIST OF REFERENCE NUMERALS

4 . . . intake manifold

5 . . . exhaust manifold

7 . . . exhaust turbocharger

11 . . . $SO_x$ trapping catalyst

13 . . . particulate filter

15 . . . $NO_x$ storing and reducing catalyst

17 . . . fuel feed valve

The invention claimed is:

1. An exhaust gas control system comprising:
an internal combustion engine having combustion chambers into which a combustion use fuel is fed for generating engine output;
a post-treatment system arranged in an engine exhaust passage of the internal combustion engine, the post-treatment system feeding a post-treatment use fuel into the exhaust gas for treating harmful components in the exhaust gas; and
an electronic control unit that controls the internal combustion engine and the post-treatment system, the electronic control unit storing (i) preset values of operating parameters of the engine such that different ones of the preset values are used for different operating states of the engine, and storing (ii) preset post-treatment use fuel feeding processes for feeding the post-treatment use fuel,
wherein each time an operating period of the engine passes a predetermined time period, the electronic control unit (a) resets the different ones of the preset values of the operating parameters for the different operating states of the engine and (b) resets the preset post-treatment use fuel feeding processes so that a total amount of consumption of the combustion use fuel and the post-treatment use fuel per set driving distance is minimized while maintaining the amounts of harmful components in the exhaust gas discharged into the atmosphere below regulatory values.

2. An exhaust gas control system as set forth in claim 1, wherein the electronic control unit judges that the operating period of the engine has exceeded the predetermined time period when a cumulative operating time of a vehicle, a cumulative operating distance of the vehicle, or a cumulative number of rotations of the engine exceeds a preset value.

3. An exhaust gas control system as set forth in claim 1, wherein the electronic control unit judges that the operating period of the engine has exceeded the predetermined time period when a degree of deterioration of the post-treatment system exceeds a predetermined degree of deterioration.

4. An exhaust gas control system as set forth in claim 1, wherein each time the operating period of the engine passes the predetermined time period, the electronic control unit determines the amount of consumption of post-treatment use fuel corresponding to a degree of deterioration of the post-treatment system, and the electronic control unit resets the preset values of the operating parameters and the method of feeding the post-treatment use fuel so that the amount of consumption of fuel per set driving distance is minimized while maintaining the amounts of harmful components in the exhaust gas discharged into the atmosphere below the regulatory values based on this the amount of consumption of post-treatment use fuel and the amount of consumption of the combustion use fuel.

5. An exhaust gas control system as set forth in claim 4, wherein each time the operating period of the engine passes the predetermined time period, the electronic control unit resets the preset values of the operating parameters and the method of feeding the post-treatment use fuel so that the amount of consumption of fuel per set driving distance is minimized while maintaining the amounts of harmful components in the exhaust gas discharged into the atmosphere below the regulatory values, based on a change in the amount of consumption of the combustion use fuel and a change in the amount of harmful components in the exhaust gas that occurs when changing the values of the operating parameters, and also based on the change in the amount of consumption of post-treatment use fuel in accordance with the change in the amount of harmful components and the degree of deterioration of the post-treatment system.

6. An exhaust gas control system as set forth in claim 5, wherein the change in the amount of consumption of the combustion use fuel and the change in the amount of harmful components in the exhaust gas when changing the values of the operating parameters are stored in advance, the change of the post-treatment use fuel when the amount of the harmful components changes is stored as a function of the degree of deterioration of the post-treatment system, each time the operating period of the engine passes the predetermined time period, the electronic control unit determines the amount of consumption of the combustion use fuel when changing the operating parameters in various ways and the amount of consumption of post-treatment use fuel in accordance with the change in the harmful components in the exhaust gas and the degree of deterioration of the post-treatment system at this time, and the electronic control unit resets the preset values of the operating parameters and the method of feeding the post-treatment use fuel so that the amount of consumption of fuel per set driving distance is minimized while maintaining the amounts of harmful components in the exhaust gas discharged into the atmosphere below the regulatory values based on the amount of consumption of post-treatment use fuel and the amount of consumption of the combustion use fuel.

7. An exhaust gas control system as set forth in claim 1, wherein one of the operating parameters is an injection timing of the combustion use fuel, and the amount of consumption of the combustion use fuel and an amount of particulate matter discharged from the combustion chamber are decreased and an amount of $NO_x$ discharged from the combustion chamber is increased when the injection timing is advanced.

8. An exhaust gas control system as set forth in claim 1, wherein one of the operating parameters is an exhaust gas recirculation rate, and the amount of consumption of the combustion use fuel and an amount of particulate discharged from the combustion chamber are increased and an amount of $NO_x$ discharged from the combustion chamber is decreased when the exhaust gas recirculation rate is increased.

9. An exhaust gas control system as set forth in claim 1, wherein the post-treatment system has an $NO_x$ storing and reducing catalyst storing $NO_x$ contained in the exhaust gas when an air-fuel ratio of an inflowing exhaust gas is lean and releasing the stored $NO_x$ when the air-fuel ratio of the inflowing exhaust gas becomes a stoichiometric air-fuel ratio or rich, the post-treatment use fuel is fed into the combustion chamber or the exhaust passage upstream of the $NO_x$ storing and reducing catalyst when making the air-fuel ratio of the exhaust gas flowing into the $NO_x$ storing and reducing catalyst the stoichiometric air-fuel ratio or rich so as to release $NO_x$ from the $NO_x$ storing and reducing catalyst, and the amount of consumption of post-treatment use fuel is increased as an amount of $NO_x$ discharged from the combustion chamber is increased, and as a degree of deterioration of the $NO_x$ storing and reducing catalyst increases.

10. An exhaust gas control system as set forth in claim 9, wherein the post-treatment system has a particulate filter for trapping particulate contained in the exhaust gas, the post-treatment use fuel is fed into the combustion chamber or the exhaust passage upstream of the particulate filter when burning off particulate matter trapped on the particulate filter, and the amount of consumption of post-treatment use fuel is increased as an amount of particulate matter discharged from the combustion chamber increases, and as a degree of deterioration of the particulate filter increases.

11. An exhaust gas control system as set forth in claim 10, wherein the $NO_x$ storing and reducing catalyst is carried on the particulate filter.

12. An exhaust gas control system as set forth in claim 9, wherein the post-treatment system has an $SO_x$ trapping catalyst able to trap $SO_x$ in the exhaust gas and arranged in the exhaust passage upstream of the $NO_x$ storing and reducing catalyst, the $SO_x$ trapping catalyst has a property that trapped $SO_x$ gradually diffuses inside the $SO_x$ trapping catalyst when a temperature of the $SO_x$ trapping catalyst rises under a lean air-fuel ratio of the exhaust gas, the post-treatment use fuel is fed into the combustion chamber or the exhaust passage upstream of the $SO_x$ trapping catalyst when raising the temperature of the $SO_x$ trapping catalyst so as to restore the $SO_x$ trap rate of the $SO_x$ trapping catalyst, and the amount of consumption of post-treatment use fuel increases as an amount of $SO_x$ discharged from the combustion chamber increases, and as a degree of deterioration of the $SO_x$ trapping catalyst increases.

* * * * *